United States Patent [19]

Curry

[11] Patent Number: 5,063,285

[45] Date of Patent: Nov. 5, 1991

[54] COUNTING DEVICE

[76] Inventor: Joseph R. Curry, 11843 E. Cornell Cir., Aurora, Colo. 80014

[21] Appl. No.: 420,049

[22] Filed: Oct. 11, 1989

[51] Int. Cl.⁵ .......................... G06C 27/00; G06C 1/00
[52] U.S. Cl. ................................. 235/114; 235/117 A
[58] Field of Search .............. 235/1 R, 1 B, 1 D, 103, 235/105, 114, 117 A

[56] References Cited

U.S. PATENT DOCUMENTS

| | | | |
|---|---|---|---|
| 394,399 | 12/1888 | Robyn . | |
| 2,264,797 | 12/1941 | Hathaway et al. | 235/114 |
| 2,753,110 | 7/1956 | Simmons | 235/1 B |
| 2,996,247 | 8/1961 | Shell | 235/114 |
| 3,120,213 | 2/1964 | Mulligan | 116/114 X |
| 4,121,744 | 10/1978 | Minear | 364/708 X |
| 4,262,898 | 4/1981 | Lee | 235/117 A X |

Primary Examiner—L. T. Hix
Assistant Examiner—Eddie C. Lee

[57] ABSTRACT

An improved counting device is provided which may be attached to the back of the hand and operated by that same hand without interfering with the use of that hand. In a preferred embodiment of the invention, a counting device is attached to the back surface of the index and middle finger of one hand in a position so that the advancing means of the counter may be activated with minimal movement of the thumb of the same hand.

4 Claims, 2 Drawing Sheets

COUNTING DEVICE

BACKGROUND OF THE INVENTION

This invention relates generally to hand-held portable counting devices, and, more particularly, to a counting device which may be operated with only one hand and which is carried in such a way as to avoid the problems presented by prior art portable counting devices.

Athletes, particularly runners, bicyclers, and swimmers, typically train by making a series of repetitive laps around a track or along a pool lane. Depending upon the distance covered on each lap and the total distance to be covered in a particular training session, the athlete is required to keep track of the cumulative total of laps. The number of laps and the elapsed time between laps are generally too great for the athlete to rely only upon his memory and some counting mechanism is required. This is particularly important in the case of the swimmer who, training in a pool 25 yards or 25 meters in length, must make 50 laps or more in a typical training session.

Neither the presence nor the operation of a counting device should interfere with the athlete's training activities. Furthermore, since many athletes are involved in several different training activities (as for purposes of triathlon or biathlon participation), the ability to use the same counter for multiple activities is highly desirable.

Several kinds of counting devices have been proposed to address the needs of these athletes. One such device is a watch which includes a lap counting function which records the cumulative number of laps based upon the athlete's depression of a button at the end of each lap. This device, however, requires a cross-handed operation which is inconvenient in the case of a bicycler or runner, and virtually impossible in the case of a swimmer.

Other prior art counting devices sometimes employed by these athletes are designed to fit in the palm of one hand, with an actuating button positioned for operation by a finger of that hand. This device may be marginally effective for a runner, but is inappropriate for use by a bicycler, whose hand must grip a bar assembly, or by a swimmer, since the presence of the device in the palm of the hand interferes with the efficient use of the swimmer's cupped hand during the swimming downstroke.

SUMMARY OF THE INVENTION

Thus, it is an object of this invention to provide an improved portable counting device which can be easily used with only one hand. It is a further object of this invention to provide an improved counting device, the use of which will not interfere with the use of the hand supporting the device. It is a still further object of this invention to provide an improved counting device which can be conveniently used by athletes participating in a number of different training activities.

The invention includes a counting means, which may be mechanical or electronic, designed to be secured adjacent to the back surface of the hand, instead of adjacent to the inside surface or palm of the hand. In this position, the counting device does not interfere with the athlete's use of that hand, such as in grasping bicycle handlebars or in swimming. The counting means includes an advancing means which is located in a position so that it may be reached and advanced by the thumb of the same hand. For example, in a preferred embodiment described below, the counting means is positioned on the back of the index and middle finger of one hand, with the advancing means operated by the thumb of that same hand. In this configuration, the counting device may be used to record successive laps with only slight movement of one hand and will not interfere with the athlete's use of that hand.

Other configurations of this counting device are possible, all of which would permit both single-handed use and non-interference with the inside surface of the hand.

DETAILED DESCRIPTION

Figure 3:
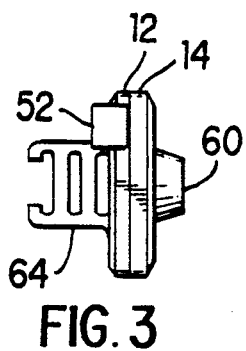
FIG. 3 is an end view of a preferred embodiment of the improved counting device.
Figure 1:
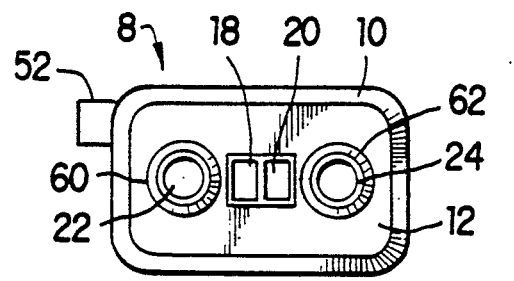
FIG. 1 is a top view of a preferred embodiment of the improved counting device.
Figure 2:
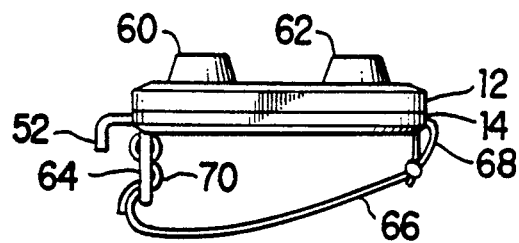
FIG. 2 is a front view of a preferred embodiment of the improved counting device.
Figure 6:
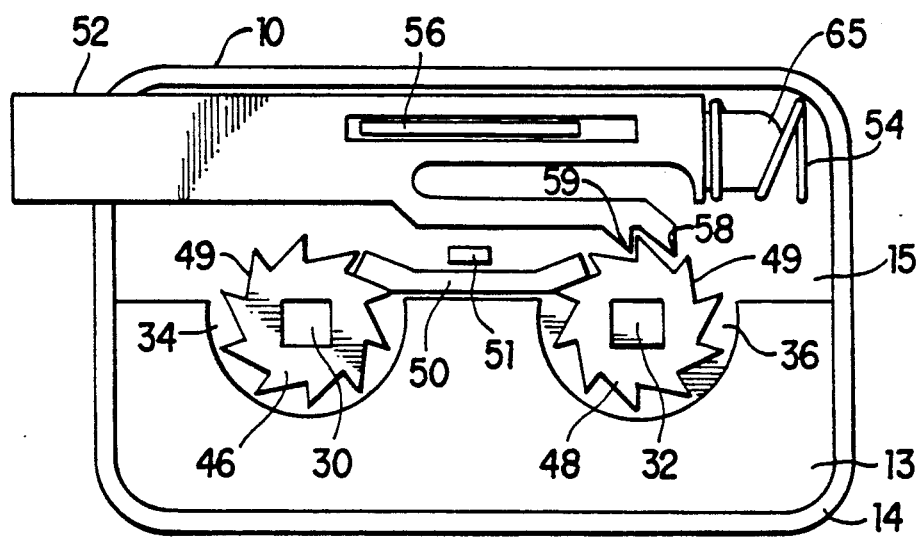
FIG. 6 is cross-sectional top view of a preferred embodiment of the counting device.

Referring now to the drawings, and more particularly to FIG. 1 and FIG. 2, a preferred embodiment of the improved counting device (8) is shown. The counting means of this embodiment includes a housing (10) having a top (12) and a bottom (14) which may be secured together by a press fit, or some other suitable securing means to form a chamber (16). The bottom of the housing includes a raised portion (13) and a depressed portion (15), as best shown in FIG. 6. The housing (10) may be formed of any suitable material, although a light weight plastic material is preferred. The top of the housing (12) includes two windows (18) and (20) located near the center of the top. The top of the housing (12) includes holes (22) and (24) located adjacent to the position of the windows (18) and (20) in the top of the housing.

Figure 4:
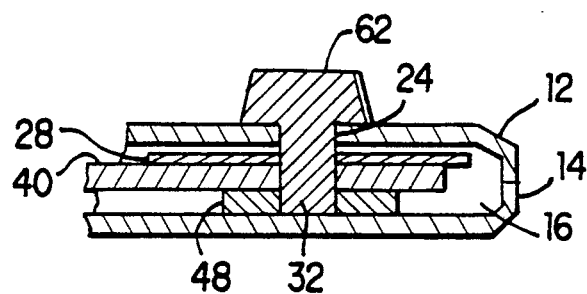
FIG. 4 is a cross-sectional front view of a portion of the preferred embodiment of the improved counting device.
Figure 5:
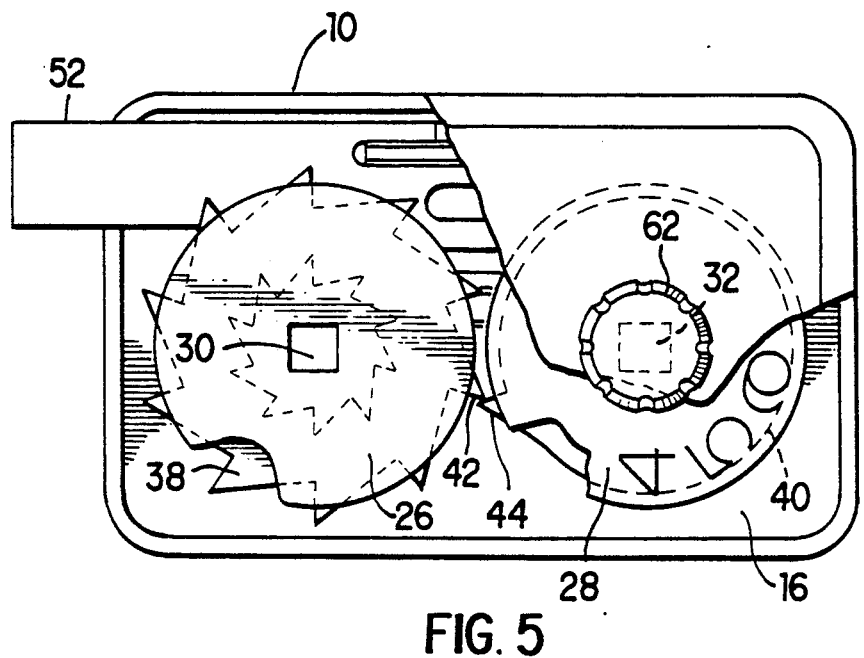
FIG. 5 is cross-sectional top view of a preferred embodiment of the counting device.

Referring to FIG. 4 and FIG. 5, rotatably mounted within the chamber (16) are two circular discs (26) (28) with each disc having the digits 0 through 9 marked on its face. The discs are rigidly mounted to shafts (30) and (32) which are rotatably mounted between the top of the housing (12) and bottom of the housing (14) through holes (22) and (24) and in depressions (34) and (36) in the bottom of the housing. Shafts (30) an (32) extend beyond the surface of the top of the housing (12). The discs (26) and (28) are positioned so that the numbers marked on each disc may be viewed through the respective windows (18) and (20) in the top of the housing (12). Rigidly affixed to each of these discs on the side opposite the marked numbers are primary gears (38) and (40). The first primary gear (38) has 10 projections (42) extending from the perimeter of the gear and evenly spaced around the circumference of the gear.

The second primary gear (40) has a single projection (44) extending from its perimeter. The primary gears (38) and (40) are positioned so that at their nearest point the projection (44) on the second primary gear (40) will engage a projection (42) on the first primary gear (38). The primary gears and projections are also positioned so that the digit 9 on the second disc (28) will appear in housing window (20) just prior to contact of projections on the primary gears (38) (40), and the "0" digit will appear after such contact.

As shown in FIG. 6, first and second secondary gears (46) (48), each having a diameter approximately one half the diameter of the primary gears (38) (40) are rigidly connected to the base of each of the primary gears. The secondary gears rotate in depressions (34) and (36) with shafts (30) and (32) and the primary gears and discs to which they are rigidly attached. Each secondary gear has 10 projections (49) extending beyond the perimeter thereof evenly spaced around its circumference. A flexible cross bar (50) having flanged ends designed to engage the projections on the secondary gears (49) is attached to the bottom of the housing (14) between the raised portion of the bottom of the housing (13) and stop (51) rigidly attached to the bottom of the housing. The engagement of the projections on the secondary gears and the cross bar (50) will prevent inadvertent rotation of the discs (26) (28) and will insure that the digits on the faces of the primary discs will be viewable through, and centered in, the windows (18) and (20) in the top of the housing (12).

Projecting from the housing (10) is an advancing means, in this case a plunger mechanism (52). The plunger mechanism (52) extends for an appropriate distance beyond the surface of the housing (10) so that in operation it may be reached by the thumb of the user's hand. As shown in FIG. 6, a spring or other suitable bias (54) is interposed between the plunger mechanism (52) and the housing (10) to return the plunger to the original position after release. Movement of the plunger is guided by a bar (56) extending from the bottom of the housing (14) and is limited by stop (65). The end of the plunger is shaped and textured to provide a comfortable and non-slip surface for thumb contact. The plunger mechanism includes projections (58) and (59) which will engage a projection (49) on the second secondary gear (48) each time the plunger mechanism (52) is depressed. Each actuation or depression of the plunger mechanism (52) and resulting engagement of plunger projection (58) and a projection on the second secondary gear (48) will cause the rotation of the second disc (28) and, if the projections on both primary gears engage, the rotation of both discs (26) and (28). After projection (58) disengages the projection on the second secondary gear (49), projection (59) contacts projection (49), further rotating the second secondary gear (48). In all cases the total resulting rotation is such that the next number marked on the face of the primary disc(s) will appear in the window(s) (18) (20) in the top of the housing.

As best shown in FIG. 2 and FIG. 4, knobs (60) (62) are rigidly attached to each shaft (30) (32) extending through the holes (22) (24) in the top of the housing (12). Each knob rotates with the disc attached to the same shaft and may be used to change the numbers appearing through windows (18) and (20) in the housing.

The bottom of the housing (14) includes an integral flange (64) located along the edge of housing nearest the plunger and extending perpendicularly beyond the bottom of housing. This flange (64) is designed to rest along the index finger of the user to prevent inadvertent rotation or movement of the improved counting device (8) when the plunger mechanism (52) is depressed.

A number of different attaching means may be used to secure the improved counting device (8) in a position adjacent to the back surface of the hand. In the preferred embodiment depicted in FIG. 2, the attaching means is a strap (66) passing through a strap connection (68) located on the bottom of the housing (14) and an adjustable strap connection means (70) located on the flange (64). Other possible attaching means include a plurality of ring-like members affixed to the housing (10) through which one or move fingers of the hand may pass, or an elastic or velcro strap attached in an appropriate manner to opposite ends of the housing.

Figure 7:
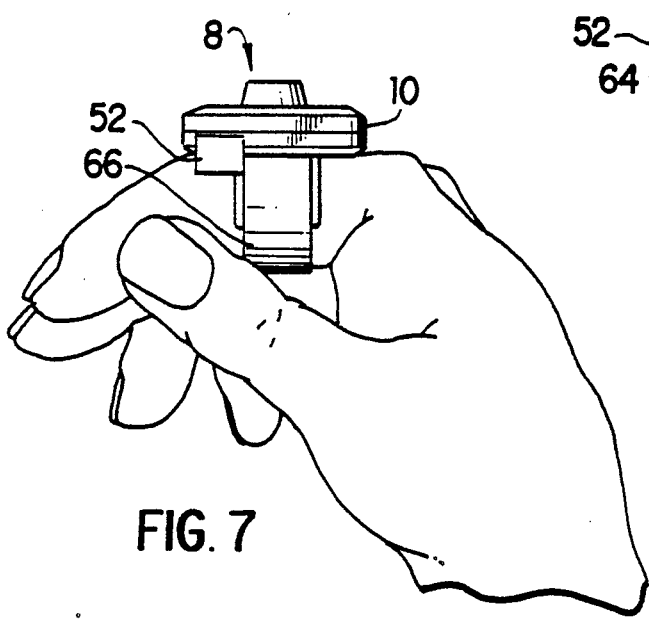
FIG. 7 is an end view of a preferred embodiment of the improved counting device showing its attachment to the back of an athlete's hand.
Figure 8:
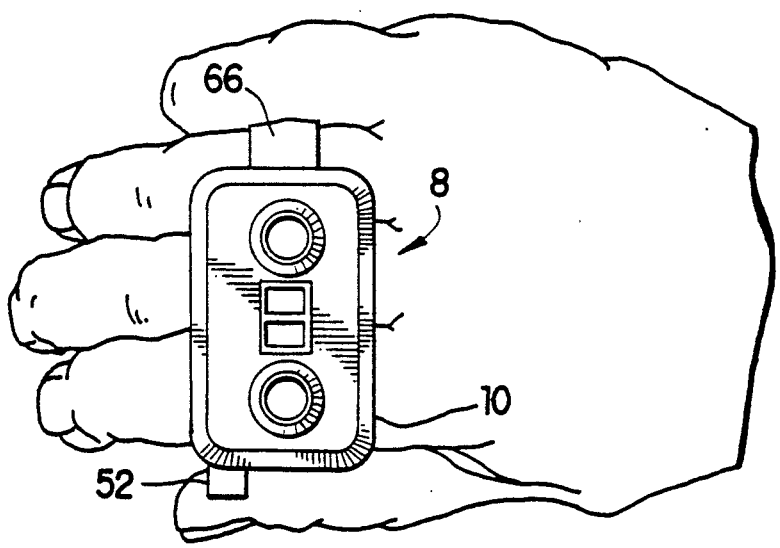
FIG. 8 is a top view of a preferred embodiment of the improved counting device showing its attachment to the back of an athlete's hand.

In operation, this preferred embodiment of the improved counting device (8) is first reset by rotating knobs (60) and (62) so that the numbers 0 appear through each of the windows (18) (20) in the top of the housing (12). The improved counting device (8) is then secured by strap (66) to the back of the index finger and middle finger of one hand, with the flange (64) positioned along the outer edge of the index finger, as depicted in FIG. 7 and FIG. 8. After completing the first lap, the athlete moves his thumb slightly to contact the end of plunger (52) and depresses the plunger. As the plunger 52) is depressed, the projection (58) on the plunger engages the projection on the second secondary gear (48), causing disc (28) to rotate with shaft (32). After projection (58) disengages the projection on the secondary gear (49), projection (59) engages projection (49) and the rotation of secondary gear (48) continues until the cross bar (50) engages the next projection on the second secondary gear (48) and prevents further rotation. After this rotation, the number 1 appears in window (20) and the number 0 appears in window (18). After depressing the plunger (52), the athlete removes his thumb from the plunger and continues his activity, and the bias means (54) returns the plunger to its original position, with the flexible plunger structure (52) permitting projection (58) to pass over the projection (49) on the second secondary gear. This process is repeated after each successive lap until, at the end of the training session, the total number of laps is displayed through windows (18) and (20). The degree of thumb movement required to advance the counting means is minimal and will not interfere with the athlete's training activity.

Another preferred embodiment of the improved counting device (not illustrated) includes a housing similar to the housing described above except instead of containing a mechanical counting mechanism utilizing discs, the housing contains a conventional electronic counting and time-keeping circuit. This circuit records the total elapsed time since activation and the number and timing of successive advances of the advancing means to calculate average lap time. The circuit includes a liquid crystal display which displays such parameters as total elapsed time, average lap time, and lap count. The design of such conventional electronic circuits is well known in the art. In this alternative embodiment, the housing depicted in FIG. 1 is modified to include appropriate display windows for the liquid crystal display and to provide additional activation and resetting buttons to control the counting and timing circuits. In this embodiment, as in the preferred mechanical embodiment described above, each depression of the plunger or other advancing means advances the number of laps recorded by the counting means.

Many other types of conventional mechanical and electric counting mechanisms or circuits, any of which record and display the number of successive actuations of an advancing means, may be incorporated in this improved counting device.

I claim:

1. A counting device comprising:
   a housing having atop and a bottom with at least one window opening in the top of said housing;
   means for attaching said housing to at least two fingers of one hand of a user so that said housing rests on the back surface of said hand of a user;
   a plunger mounted for reciprocating movement within said housing and having one end thereof extending to the exterior of said housing, with said end extending to the exterior of said housing configured so that it may be depressed with the thumb of the same hand of the user to which said housing is attached; and
   means for recording and displaying through said window opening the number of successive depressions of said plunger comprising a plurality of discs, each having a front and back surface and having numerals on the front surface thereof, rotatability mounted within said housing and engaging said plunger so that successive depressions of said plunger causes rotation of one or more of said discs so that successive numerals on the front surface thereof are displayed through said window opening; and
   a flange rigidly fixed to and extending perpendicularly below the bottom of said housing to contact said finger of a user thereby preventing inadvertent movement of the counting device.

2. The counting device of claim 1 wherein said attaching means comprises an adjustable strap with one end fixed to said flange and the other end fixed to the bottom of the opposite end of said housing.

3. A counting device comprising:
   a housing having a top and a bottom with at least one window opening in the top of said housing;
   means for attaching said housing to at least two fingers of one hand of a user so that said housing rests on the back surface of said hand of a user;
   a plunger mounted for reciprocating movement within said housing and having one end thereof extending to the exterior of said housing, with said end extending to the exterior of said housing configured so that it may be depressed with the thumb of the same hand of the user to which said housing is attached; and
   means for recording and displaying through said window opening the number of successive depressions of said plunger comprising a conventional electronic counting and timekeeping circuit and display contained within said housing with the display thereof positioned beneath said window opening; and
   a flange rigidly fixed to and extending perpendicularly below the bottom of said housing to contact said finger of a user thereby preventing inadvertent movement of the counting device.

4. The counting device of claim 3 wherein said attaching means comprises an adjustable strap with one end fixed to said flange and the other end fixed to the bottom of the opposite end of said housing.

* * * * *